Nov. 9, 1954 G. R. KERR 2,694,132
HEATING ATTACHMENT FOR OUTSIDE VEHICLE MIRRORS
Filed June 4, 1952
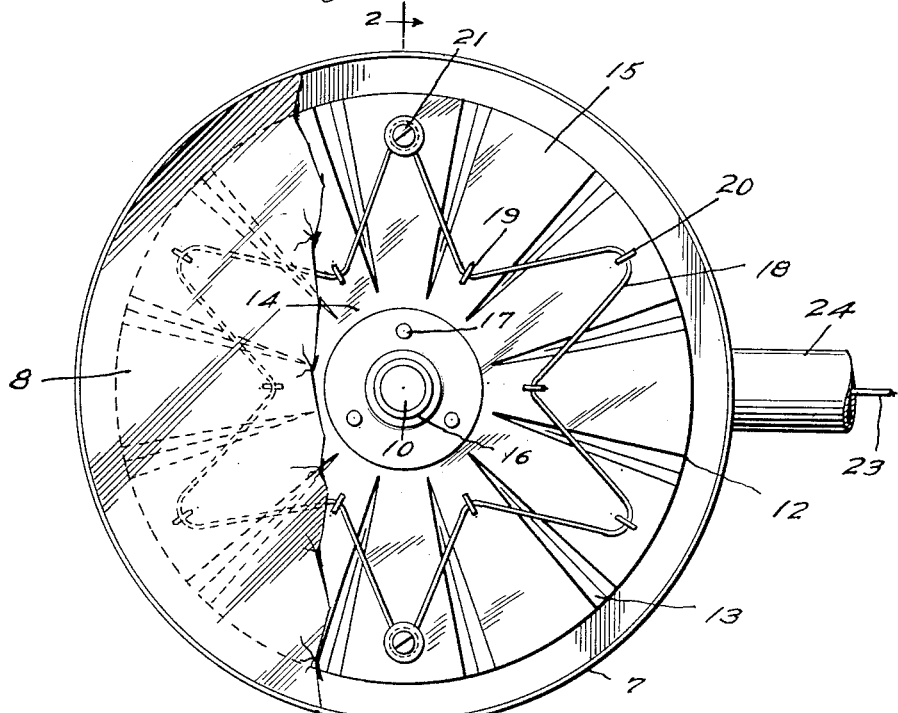
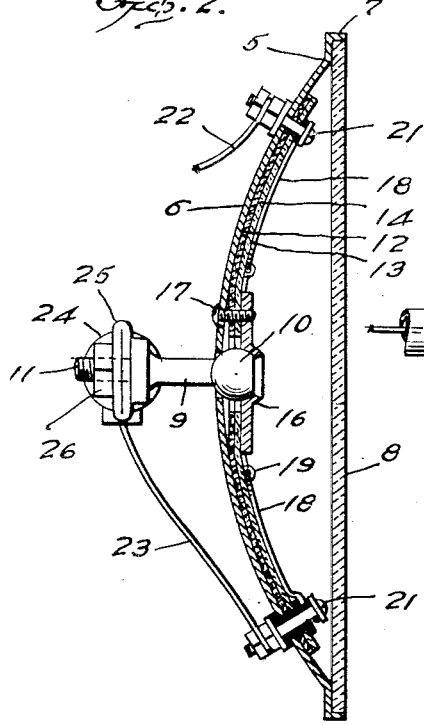
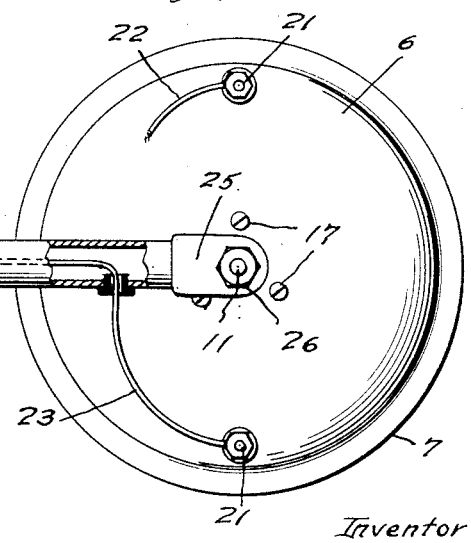
Inventor
George R. Kerr
By Bernard F. Garvey
ATTY.

United States Patent Office 2,694,132
Patented Nov. 9, 1954

2,694,132

HEATING ATTACHMENT FOR OUTSIDE VEHICLE MIRRORS

George R. Kerr, Philipsburg, Pa., assignor of one-half to Joseph Kowalcyk, Houtzdale, Pa.

Application June 4, 1952, Serial No. 291,650

2 Claims. (Cl. 219—19)

Many attempts have been made almost since the inception of the automotive industry to provide an outside rear vision mirror which would not cloud or frost regardless of weather conditions, a late illustration of which constitutes the subject matter of United States Patent No. 2,565,256, August 21, 1951. There has been no commercial adoption of any type of heated mirror for various reasons including operational failure with temperature changes and the like. This failure is attributable, at least in part, to the construction of the mirror and its heating unit, the mirror entity being necessarily of special design to accommodate the heating means employed. It is, therefore, an object of this invention to provide a mirror heating means which may be incorporated into any conventional outside rear vision mirror of trucks and passenger vehicles of various miscellany.

In carrying out the objects of this invention I employ a single wire stretched over and secured to the mirror casing directly beneath the mirror in a manner to quickly heat the mirror with obvious results.

With the present invention the mirror entity may be adjusted in the usual manner and the heating unit secured with a couple of simple fasteners to which the power wires are anchored, said wires being in circuit with the vehicle battery through a standard control switch.

Other objects of the invention will be apparent from the following description of the presently preferred form of the invention, wherein:

Fig. 1 is a front elevational view partly in section of an outside rear vision motor vehicle mirror entity, a part of the mirror glass being broken away to disclose the application of the present invention;

Fig. 2 is a vertical sectional view taken on the line 2—2 of Fig. 1 looking in the direction of the arrows, and Fig. 3 is a rear elevational view partly in section of a mirror entity illustrating the application of my invention thereto.

The device of the present invention includes an outside rear vision mirror entity 5 of standard construction consisting of a simple concavo-convex type of housing or casing 6 which is provided with the usual peripheral annulus 7 which engages the perimeter of a mirror 8 of standard construction. The mirror entity also includes a shaft 9 which is swivelled, as indicated at 10, to the center of the housing 6, in a manner presently described, the outer free end of the shaft being screw threaded, as indicated at 11, for a purpose hereinafter described.

The inner or convex side of the casing 6 is equipped with an insulated covering, generally designated 12, the covering in the present instance consisting of an asbestos base 13 and superimposed mica disc 14 which includes a plurality of radial segments 15. It will be noted, particularly upon reference to Fig. 2 of the drawing, that the asbestos base 13 and mica disc 14 are provided with central openings to complement the opening for the swivel end 10 of the shaft 9, said swivel end of the shaft and its housing 16, together with the insulated covering 12, being secured to the casing 6 by common means 17 which in the present instance consists of screws, the kerf ends of which are engageable from the convex side of the casing 6 as shown in Fig. 3.

A single strand of heating wire 18 is mounted on the insulated covering 12 and specifically with the outer face of the segments 15 of the mica disc. I have found from experiment that best results are obtained if the wire is arranged substantially as shown to advantage in Fig. 1 with intermediate portions secured, as indicated at 19, adjacent the center of the casing 6 and outer intermediate portions of the wire secured to the segments, as indicated at 20, near the outer terminals of the segments. The wire 18 is engaged at diametrically opposite points with posts 21 which latter, as advantageously illustrated in Fig. 2, extend through the segments 15, insulated base 13 and inner wall of the casing 6. One of the posts 21 is engaged with one end of a ground wire 22, the opposite end of said wire being secured to a part of the vehicle or the like in a well-known manner. The other post 21 is engaged with an electrical conductor 23 which may be extended through a hollow vehicle engaging arm 24 and with a battery through a control switch (the battery and switch not shown in the drawing). The inner end of the arm 24 may be flattened, as indicated at 25, and secured to the shaft 9 by a nut 26.

In use of this device the arm 24 is engaged with the vehicle in a well-known manner and the mirror entity is capable of manual adjustment on its swivel in a customary manner. When it is desired to heat the mirror casing the control switch is manually operated and the heating wire 18 becomes operative to heat the casing and correspondingly to relieve the mirror 8 of any accumulated snow, frost or the like, and to prevent further accumulation on the mirror while the casing is heated. It has been found from actual experience that with the present heating unit connected to a standard rear vision mirror, in accordance with the teaching of this invention, the mirror can be relieved of any normal accumulation of moisture deposit in less than a minute.

Various changes may be made within the scope of the appended claims.

What I claim is:

1. A heating unit as described including a mirror equipped concavo-convex casing, a heat resistant electrically insulated covering for the inside of the casing under the mirror, said covering being radially segmented for adaptation to casings of different curvature, a shaft extending through the center of the casing and the insulated covering for connecting the casing to a vehicle, a housing engaged over the inner end of the shaft and over the central portion of the insulated covering, common means securing the housing and the covering to the casing, and a heating wire engaged to said covering completely around said housing, the wire being adapted for engagement to a source of electrical energy.

2. A heating attachment as described in combination with an outside rear vision motor vehicle mirror including a concavo-convex casing, a mirror and a vehicle-attaching shaft; a heat resistant electrically insulated covering mounted on the inner face of said casing under the mirror, said covering being radially segmented for adaptation to casings of different curvature, and a heating wire engaged with said covering at points near the center of the casing and at points near the casing perimeter to distribute the heat over a substantial area of the mirror.

References Cited in the file of this patent

UNITED STATES PATENTS

| Number | Name | Date |
|---|---|---|
| 1,933,173 | Hunt | Oct. 31, 1933 |
| 1,982,410 | Atkinson | Nov. 27, 1934 |
| 2,015,816 | Pyzel | Oct. 1, 1935 |
| 2,414,223 | De Virgilis | Jan. 14, 1947 |
| 2,514,647 | Jolliffe | July 11, 1950 |
| 2,565,256 | Myers et al. | Aug. 21, 1951 |
| 2,585,273 | Prutzman | Feb. 12, 1952 |